(12) United States Patent
Hamilton

(10) Patent No.: US 6,967,852 B2
(45) Date of Patent: Nov. 22, 2005

(54) POWER CONVERTER WITH DYNAMIC CURRENT LIMITING

(75) Inventor: Douglas L. Hamilton, Deerwood, MN (US)

(73) Assignee: Silent Power, Inc., Maple Grove, MN (US)

( * ) Notice: Subject to any disclaimer, the term of this patent is extended or adjusted under 35 U.S.C. 154(b) by 34 days.

(21) Appl. No.: 10/740,782

(22) Filed: Dec. 19, 2003

(65) Prior Publication Data

US 2005/0135121 A1  Jun. 23, 2005

(51) Int. Cl.[7] .............................................. H02M 3/315
(52) U.S. Cl. ........................ 363/24; 363/25; 363/133
(58) Field of Search .............................. 363/24, 25, 26, 363/133, 134

(56) References Cited

U.S. PATENT DOCUMENTS

| | | | |
|---|---|---|---|
| 4,028,612 A | 6/1977 | Orlando | |
| 4,346,342 A | 8/1982 | Carollo | |
| 4,742,441 A | 5/1988 | Akerson | |
| 4,776,433 A | 10/1988 | Lagree et al. | |
| 5,239,255 A | 8/1993 | Schamin et al. | |
| 5,373,433 A | 12/1994 | Thomas | |
| 5,414,609 A * | 5/1995 | Levran et al. | ................. 363/25 |
| 5,510,974 A * | 4/1996 | Gu et al. | ...................... 363/24 |
| 5,537,308 A | 7/1996 | Gritter | |
| 5,576,941 A * | 11/1996 | Nguyen et al. | ............... 363/26 |
| 5,684,683 A | 11/1997 | Divan et al. | |
| 6,021,052 A | 2/2000 | Unger et al. | |
| 6,023,193 A | 2/2000 | Ierymenko | |
| 6,343,026 B1 | 1/2002 | Perry | |
| 6,661,210 B2 | 12/2003 | Kimball et al. | |

* cited by examiner

Primary Examiner—Bao Q. Vu
(74) Attorney, Agent, or Firm—Kinney & Lange, P.A.

(57) ABSTRACT

An electrical power converter receives input power of one type or level at input terminals and supplies output power of another type or level at output terminals. The power converter includes a high frequency transformer, an input circuit connected between the input terminals and the primary of the transformer, and an output circuit connected between the secondary of the transformer and the output terminals, a controller for controlling pulse width of current pulses produced by the input circuit, and a current limiting circuit. The current limiting circuit allows very high surge currents immediately upon demand without waiting for a voltage drop feedback circuit, then dynamically reduces the current limit over time based on the averaged current in the input circuit.

12 Claims, 4 Drawing Sheets

POWER CONVERTER WITH DYNAMIC CURRENT LIMITING

CROSS-REFERENCE TO RELATED APPLICATION(S)

Reference is made to a copending application Ser. No. 10/740,786 entitled "Power Converter with Improved Output Switching Timing," filed on even date with this application, and which is incorporated by reference.

BACKGROUND OF THE INVENTION

The present invention relates to electrical power conversion. More particularly, the present invention relates to a power converter having dynamic current limiting.

Electrical power is supplied in one of two forms: direct current (DC) power and alternating current (AC) power. There are often times when it is desirable to convert one form of electrical power to another form. A power converter can convert power from AC to DC, DC to AC, AC to AC, or DC to DC. In this way, a power converter allows a device that uses one form or level of power to connect to a power source that supplies a different form or level of power.

Most power converters have a surge power rating, which is typically a multiple of a continuous rating. The surge power rating is typically about twice the continuous rating, and in some cases may be as high as three or four times the continuous rating. A power surge from a power converter is needed, for example, when an electrical motor first starts. There must be enough current delivered from the power converter to initiate rotation of the rotor of the motor. This involves overcoming static and inertial forces in the motor. As a result, a higher level of current is required for a short period of time when first starting an electrical motor. Once the motor is turning, the power demand is reduced to the normal operating range of the converter (i.e. below the continuous power rating).

One advantageous form of power converter makes use of a high frequency transformer in conjunction with an input circuit which produces high frequency pulse width modulated current pulses to the primary of the transformer. An output circuit connected to the high frequency transformer converts the transformed pulse width modulated pulses into the desired form of output power, such as continuous wave AC power. Power converters of this type generally include some form of feedback control which will limit maximum current to a level corresponding to the surge power rating. The feedback circuit typically senses voltage at the output of the power converter. When output voltage decreases (such as when a motor is being started), the feedback circuit causes the normal current limit of the input circuit to increase up to the maximum or surge limit. Current is allowed to remain at the higher level for a set time period (for example: five seconds). If the current does not decrease by the end of that time period, the power converter stops so that the higher current levels do not damage electrical components of the converter or the load (such as a motor) connected to the output of the power converter.

This type of current limiting feedback control causes a delay in matching the maximum current limit to the demand for higher current. It is immediately when the motor turns on that the highest current is needed, yet the feedback control requires numerous AC cycles to increase the current limit up to the surge power rating. In the meantime, the increasing current causes electrical components such as transistors within the power converter to heat up, and causes increased heat within the motor, without providing enough current to break the motor free and allow it to start turning. Ideally, the current limit should be at its highest when the motor first calls for current and then should decrease over time. Prior current limiting feedback control, however, does not allow current to be at a maximum when current is first called for by the motor, but rather introduces a time delay before maximum current is available.

BRIEF SUMMARY OF THE INVENTION

The present invention is a power converter having dynamic current limiting, in which the current limit is at its highest level when an initial demand for current is received, and in which the current limit decreases over time as a function of averaged current through the input circuit of the power converter. This method not only allows surge current to be available immediately (before components heat up), but consequently allows for a short but extremely high surge (e.g. on the order of 10 to 20 times continuous current).

The power converter of the present invention includes input terminals for receiving input power and output terminals for supplying output power. An input circuit is connected between the input terminals and a primary of a transformer, while an output circuit is connected between a secondary of the transformer and the output terminals. A controller controls the input circuit to provide pulse width modulated pulses to the primary. A current limiting circuit senses the pulse width modulated pulses and causes the controller to control the pulse width of the pulses as a function of averaged current in the input circuit. As the averaged current through the input circuit increases over time, the current limit decreases, thereby causing the pulse width of the pulses to be controlled to maintain current within a dynamic current limit.

DETAILED DESCRIPTION

Figure 1:
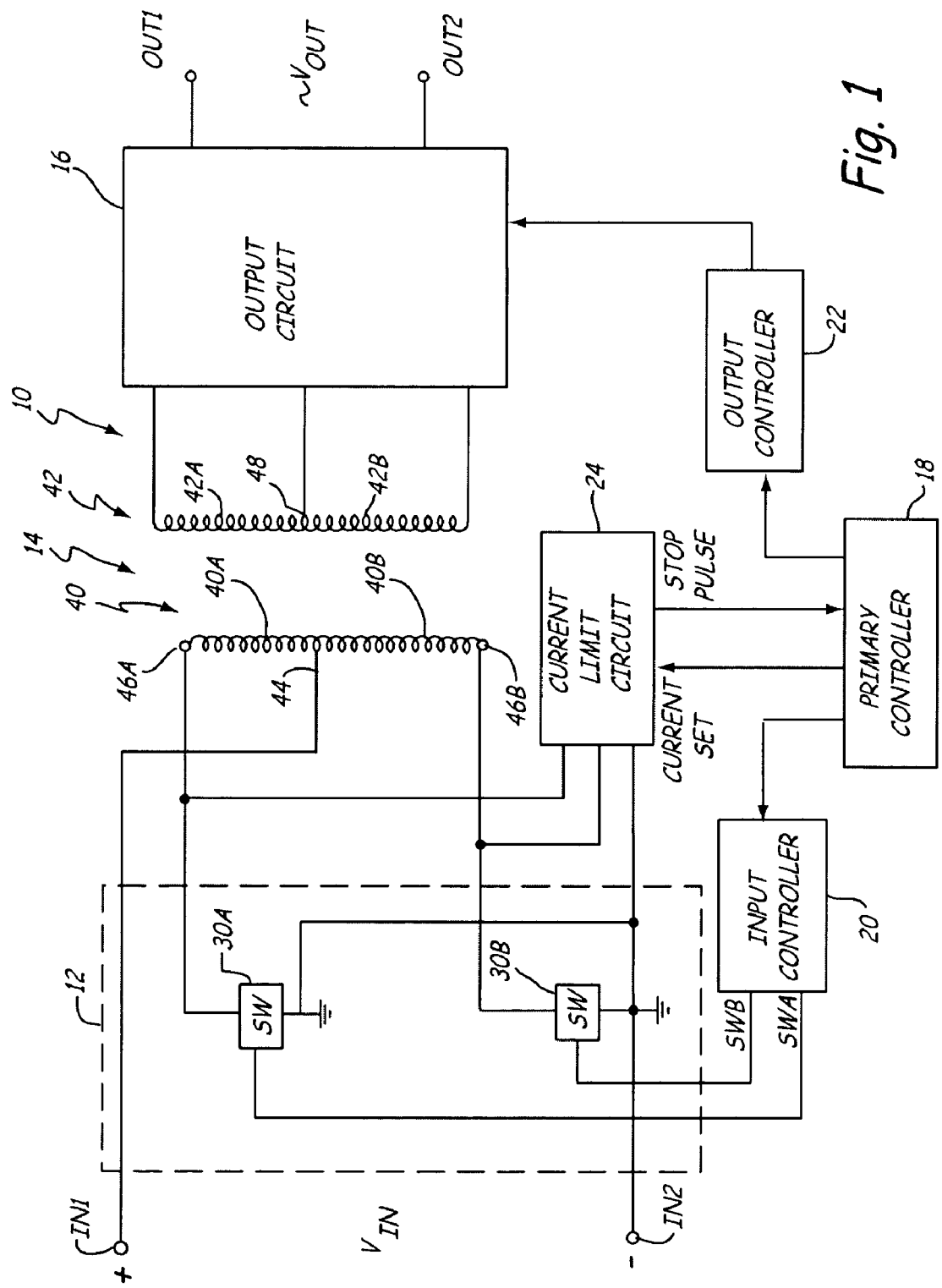
FIG. 1 is a block diagram of the power converter of the present invention.

FIG. 1 is a block diagram of power converter 10 of the present invention. Power converter 10 includes input terminals IN1 and IN2, output terminals OUT1 and OUT2, input circuit 12, transformer 14, output circuit 16, primary controller 18, input controller 20, output controller 22, and current limit circuit 24. Input DC power having a voltage VIN is received at input terminals IN1 and IN2 from a DC power source. Power converter 10 provides output AC power having voltage $V_{OUT}$ to an electrical load connected to output terminals OUT1 and OUT2.

In the embodiment shown in FIG. 1, input circuit 12 is a push-pull circuit which provides high frequency pulse width modulated pulses to transformer 14. Input circuit 12 includes first switch 30A and second switch 30B. Each switch 30A and 30B includes one or more semiconductor switches, such as MOSFETS, bipolar transistors, or solid state relays. Switches 30A and 30B are controlled by control pulses SWA and SWB, respectively, from input controller 20.

Transformer 14 includes primary winding 40 and secondary winding 42. In the embodiment shown in FIG. 1, primary winding 40 is a center tapped primary, having first leg 40A and second leg 40B connected at center tap 44. Input terminal IN1 is connected to center tap 44. First leg 40A is connected at node 46A to one of the main current carrying terminals of switch 30A while the other main current carrying terminal of switch 30A is connected to input terminal IN2. Similarly, leg 40B is connected at node 46B to one of the main current carrying electrodes of switch 30B, while the other main current carrying electrode of switch 30B is connected to input terminal IN2.

Switches 30A and 30B are operated in a push-pull pulse width modulated mode. When switch 30A is turned on, current flows from input terminal IN1 to center tap 44, through first leg 40A of primary 40 and through switch 30A to input terminal IN2. Similarly, when switch 30B is turned on, current flows from IN1 to center tap 44, through primary leg 40B and switch 30B to input terminal IN2. The time duration of the current pulses through windings 40A and 40B are controlled by the control pulses SWA and SWB received by switches 30A and 30B from input controller 20.

Secondary winding 42 is also a center tapped winding, with legs 42A and 42B connected together at center tap 48. Output circuit 16 is connected to secondary 42 to receive transformed pulses. Output controller 22 provides control signals to output circuit 16 to convert the transformed pulses to a full wave AC output at output terminals OUT1 and OUT2. Output circuit 16 can take many different forms. One example of output circuit 16 is shown in copending application entitled "Power Converter With Improved Output Switching Timing," filed on even date with this application. The operation of input circuit 12 and output circuit 16 is coordinated by primary controller 18, which provides timing and control signals to input controller 20 and output controller 22.

Current limit circuit 24 senses current flowing through switches 30A and 30B when the switches are turned on. The sensed current is compared to a dynamic current limit which is a function of the current flowing through switches 30A and 30B averaged over time. The longer the time, the lower the current limit, which allows current to be at a maximum when the current demand is first created (such as by turning on a motor which is connected to output terminals OUT1 and OUT2).

When a current pulse flowing through either switch 30A or 30B exceeds the dynamic current limit, a shut-down signal is supplied to primary controller 18. That causes primary controller 18 to signal input controller 20 to terminate the current pulse then flowing through either switch 30A or 30B. In other words, as soon as the current pulse reaches the dynamic current limit, that pulse width modulated pulse is terminated. The width of the pulses, therefore, is limited by the dynamic current limit.

Figure 2A:
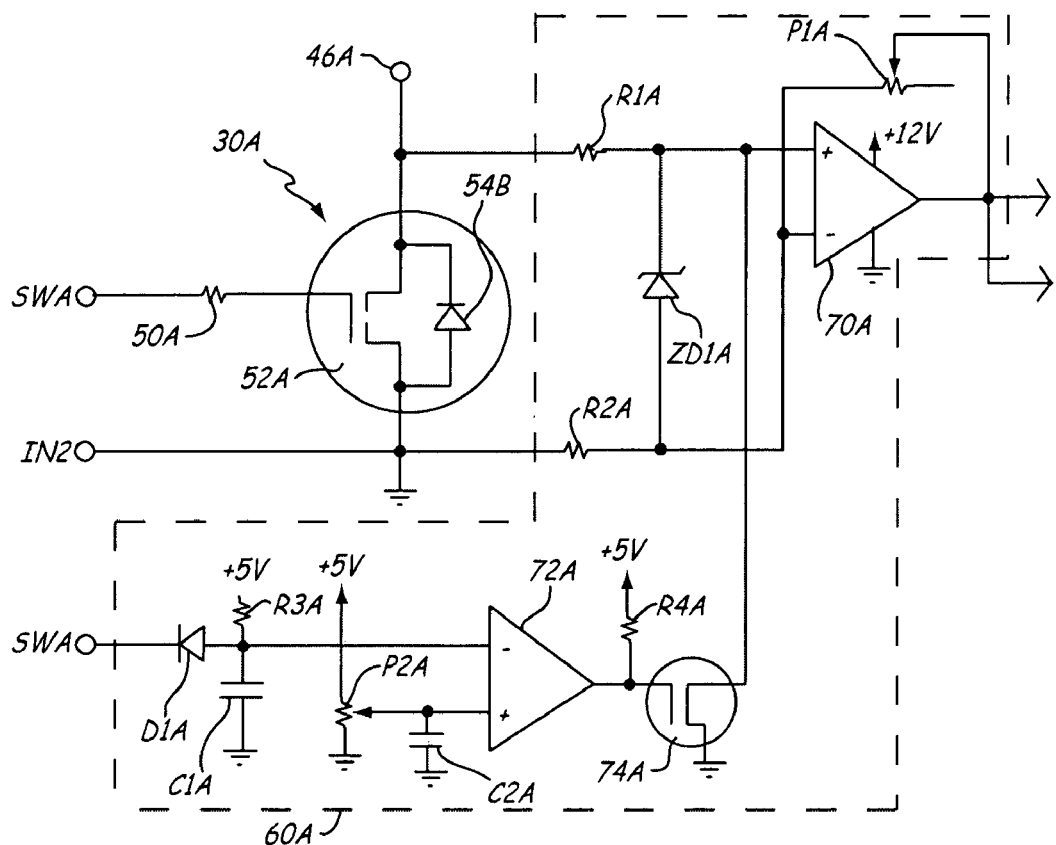
FIGS. 2A and 2B are a schematic diagram of one embodiment of the dynamic current limiting circuit of the power converter of FIG. 1.
Figure 2A:
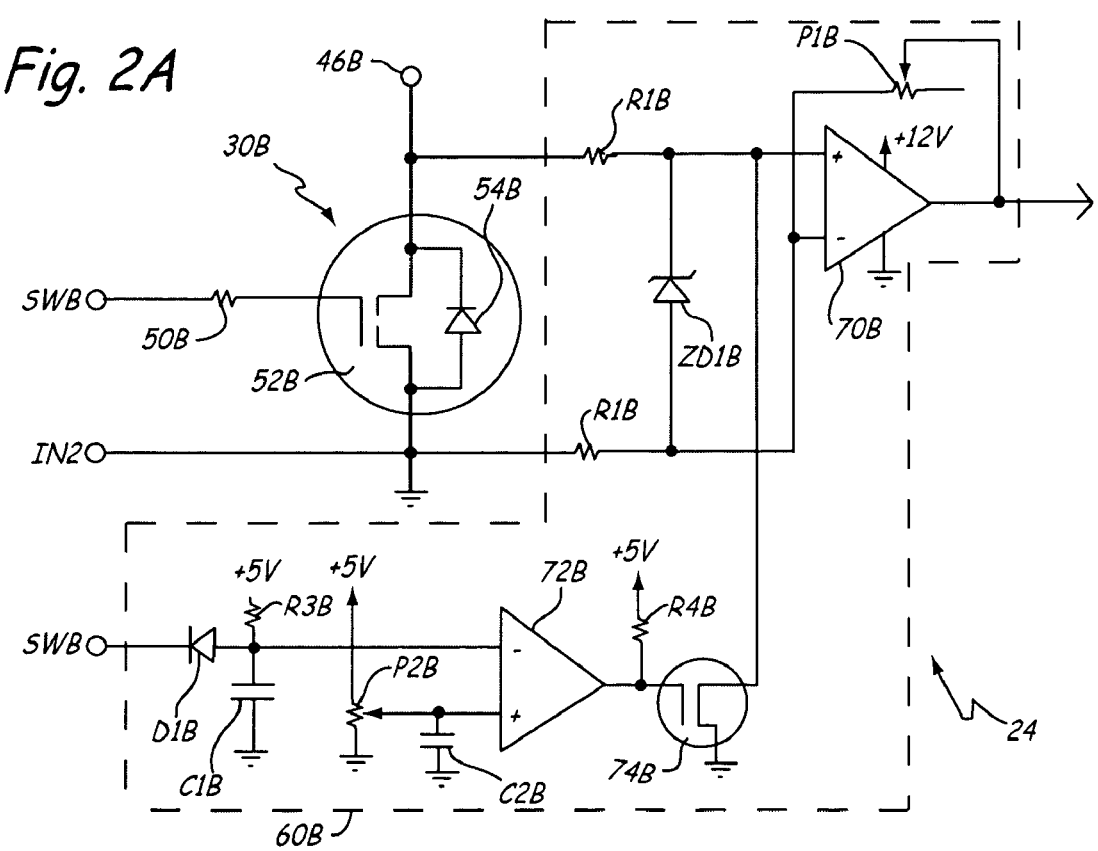
Figure 2B:
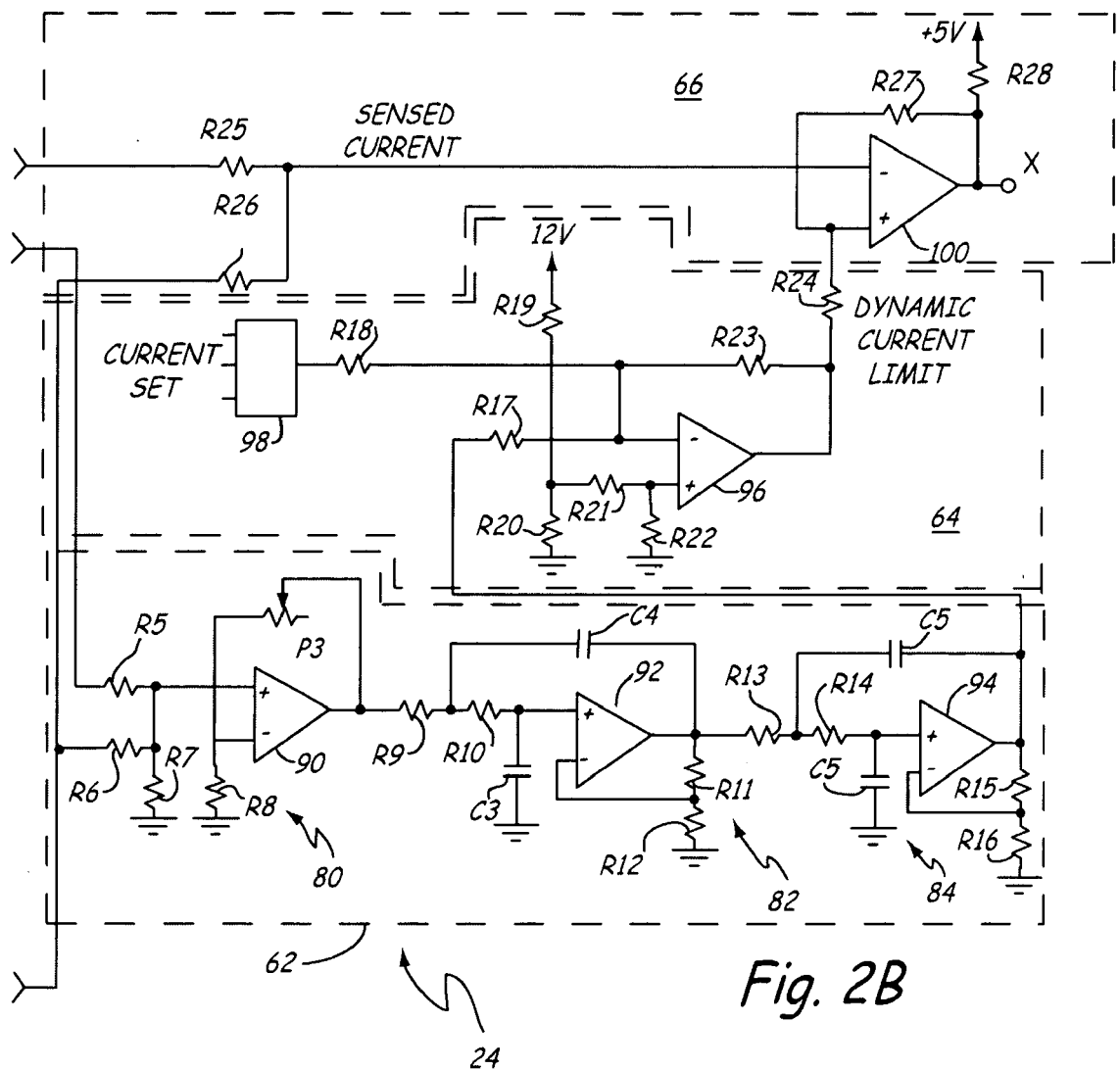

FIGS. 2A and 2B are schematic diagrams showing current limit circuit 24 together with switches 30A and 30B. In FIG. 2A, switch 30A is shown as including input resistor 50A, and MOSFET 52A (with inherent diode 54A shown). The gate of MOSFET 52A receives SWA control pulses from input controller 20. The drain of MOSFET 52A is connected to node 46A at one end of primary winding leg 40A. The source of MOSFET 52A is connected to ground and to input terminal IN2.

Similarly, switch 30B includes input resistor 50B, and MOSFET 52B (with inherent diode 54B shown). The gate of MOSFET 52B receives SWB control pulses from input controller 20. The drain of MOSFET 52B is connected to node 46B at one end of primary winding leg 40B. The source of MOSFET 52B is connected to ground and to input terminal IN2.

Although switches 30A and 30B are each shown as a single MOSFET switch, they may also be implemented using a number of MOSFET switches in parallel. Alternatively, bipolar transistors or solid state relays can be used in switches 30A and 30B.

Current limit circuit 24 has five main portions: current sensing circuits 60A and 60B, filter 62, limit generator 64, and comparator circuit 66. Current sensing circuits 60A and 60B sense the current flowing through switches 30A and 30B, respectively, when those switches are turned on. The sensed current is provided by sensing circuits 60A and 60B to filter 62 and to comparator 66. Filter 62 provides an averaged current value to limit circuitry 64. The output of limit circuit 64 is a dynamic current limit signal which is used by comparator circuit 66 to compare with the sensed current signal. As long as the sensed current during any closure of switch 30A or switch 30B is less then the dynamic current limit, the output of comparator circuit 66 is high. If the sensed current during the pulse rises to a level that exceeds the current limit, the output comparator 66 goes low which causes primary controller 18 to terminate the current pulse. Primary controller 18 can also change the dynamic current limit by providing a Current Set signal to limit generator 64.

Current sensing circuit 60A includes operational amplifier 70A, comparator 72A, MOSFET 74A, zener diode ZD1A, resistors R1A, R2A, R3A and R4A, diode D1A, capacitors C1A and C2A, and potentiometers P1A and P2A. Current sensing circuit 60B has similar components, which are labeled similarly except that the reference numerals are followed by the letter "B". The operation of each circuit is the same, and will be described with reference to current sensing circuit 60A.

Operational amplifier 70A senses current through switch 30A by comparing voltage at the source and drain of MOSFET 52A. The non-inverting input of operational amplifier 70A is connected through resistor R1A to the source of MOSFET 52A, while the inverting input is connected through resistor R2A to the drain of MOSFET 52A. The output of operational amplifier 70 varies as a function of the sensed voltage, which is representative of the current flowing through switch 30A when it is closed.

When switch 30A is open, the non-inverting input of operational amplifier 70A is connected to ground, thereby disabling the output of operational amplifiers 70 except during the time when a current pulse is flowing through switch 30A. Circuitry including diode D1A, resistor R3A, capacitor C1A and C2A, potentiometer P2A, comparator 72A, resistor R4A, and MOSFET 74A respond to the SWA control pulse. MOSFET 74A is OFF when switch 30A is turned ON. The output of comparator 72A provides immediate turning ON of switch 74A, but delays the turning OFF of MOSFET 74A so that the leading edge noise which otherwise would be presented to operational amplifier 70A can be shorted to ground through transistor 74A. The output of comparator 72A is normally high, causing MOSFET 74A to be ON, except when the SWA pulse is high. At that point, diode D1A will be reversed biased and the voltage at the minus input of comparator 72A will rise toward 5 volts as capacitor C1A begins to charge. When the voltage at the minus input exceeds the reference voltage set by potentiometer P2A at the plus input of comparator 72A, the output of comparator 72A goes low, turning OFF MOSFET 74A.

The outputs of operational amplifiers 70A and 70B of current sensing circuits 60A and 60B are provided to both comparator circuit 66 and to filter 62. Sensed currents are averaged within filter 62 for use in setting the dynamic current limit.

Filter 62 shown in FIG. 2B includes gain adjustment stage 80 and Bessel filter stages 82 and 84. Gain adjustment stage 80 includes operational amplifier 90, resistors R5–R8 and potentiometer P3. First Bessel filter stage 82 includes operational amplifier 92, resistors R9–R12 and capacitors C3 and C4. Second Bessel filter stage 84 includes operational amplifier 94, resistors R13–R16 and capacitors C5 and C6.

The inputs to filter 62 are the sensed current outputs of current sensing circuits 60A and 60B. These sensed current signals are pulses which occur during the time when switches 30A and 30B are turned on. The inputs are summed and amplified at gain adjustment stage 80 and then are filtered at filter stages 82 and 84 to produce an averaged current signal. When a load such an electrical motor is first turned on, the output of filter 62 is at a minimum level. As the amount of current being drawn increases, the averaged sensed current will increase at the output of filter 62.

Limit circuitry 64 receives the output of filter 62, adds it to a current limit adjust signal, and inverts the sum to produce a dynamic current limit signal. Limit circuit 64 receives digital commands from primary controller 18 through which primary controller 18 can adjust the current limit and set the initial (highest) limit. Limit circuit 64 includes operational amplifier 96, digital-to-analog (D/A) converter 98, and resistors R17–R24.

Operational amplifier 96 acts as an inverter. A voltage divider formed by R19–R22 provides a reference voltage to the non-inverting input of operational amplifier 96. The inverting input of operational amplifier 96 receives the averaged sensed current through resistor R17 and a current limit adjustment provided by primary controller 18 through digital-to-analog converter 98 and resistor R18.

The output of limit circuit 64 is a dynamic current limit signal in the form of a voltage applied to comparator circuit 66. In the embodiment shown in FIG. 2B, comparator circuit 66 includes comparator 100 and resistors R25–R28. Comparator circuit 66 compares the sensed current (which is supplied to the minus input of comparator 100) with the dynamic current limit (which is supplied to the plus input of comparator 100). Comparator circuit 66 includes hysteresis feedback through resistor R27. The output of comparator circuit 66 is a Stop Pulse signal which is active when it goes low. In other words, when the output of comparator circuit 66 goes low, primary controller 18 terminates the current pulse through whichever input switch is active, switch 30A or switch 30B.

Figure 3B:
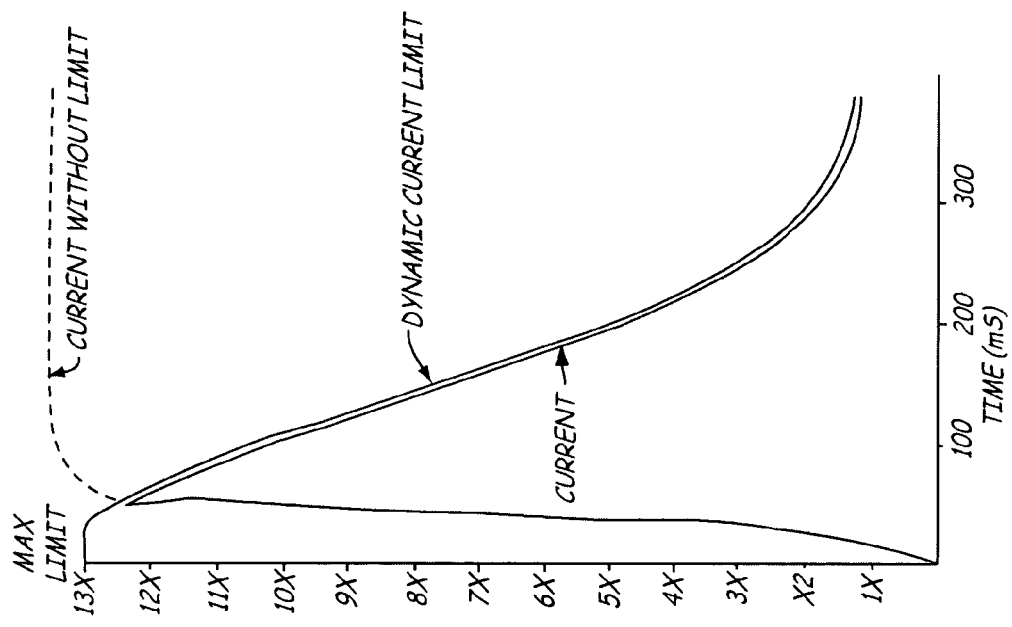
FIG. 3B is a graph of current as a function of time, showing motor current and dynamic current limit in a case of a motor with a locked rotor or a direct short across the converter output.
Figure 3A:
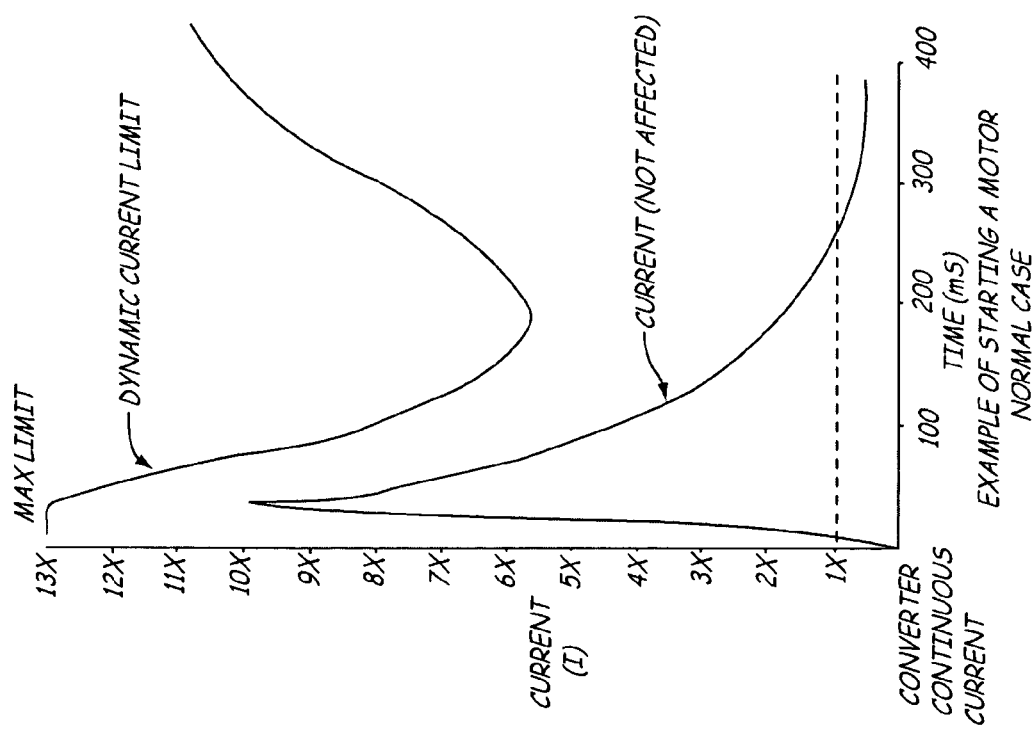
FIG. 3A is a graph of motor current as a function of time, showing input current and dynamic current limit in a normal case of starting a motor.

FIGS. 3A and 3B are graphs illustrating the operation of the present invention. FIG. 3A illustrates a normal case of starting a motor, while FIG. 3B illustrates a case in which the motor has a locked rotor or there is a direct short across the output of the converter. In both Figures, current I is shown on a vertical scale as multiples of the converter continuous current X, while time in milliseconds is shown on a horizontal axis.

In FIG. 3A, both the motor current and the dynamic current limit are shown. In this normal case, the maximum limit of the dynamic current limit is higher than the peak motor current required to start motor rotating. At all times, the dynamic current is higher than the motor current, and therefore the motor current is not affected. Because the dynamic current limit is a function of the inverted and averaged input current, it is at its maximum as the motor first starts—when the need for motor current is greatest.

FIG. 3B illustrates a situation where current at the output of the converter would rise to and stay at a level (shown by a dashed line) which could damage components of the converter and the motor. In this case, however, the rise of output current is curtailed by the decreasing dynamic current limit. The output current is forced downward by the decreasing dynamic current limit. Eventually, the output voltage drops to a level which causes primary controller 18 to shut off the converter.

In conclusion, the power converter of the present invention provides dynamic current limiting which permits high levels of current immediately when starting a load such as an electrical motor, while reducing the current limit over time to avoid damage to either the electrical components in the power converter or the load. This dynamic current limit is achieved by sensing current flowing through the switches of the input circuit while they are turned on and producing a current limit which varies as a function of the averaged or total sensed current over time. As the averaged sensed current increases, the dynamic current limit decreases so that pulse width of pulses generated by the input circuit are controlled to maintain current within the dynamic current limit.

Although the present invention has been described with reference to preferred embodiments, workers skilled in the art will recognize that changes may be made in form and detail without departing from the spirit and scope of the invention.

What is claimed is:

1. A power converter comprising:
   input terminals for receiving input power;
   output terminals for supplying output power;
   a transformer having a primary and a secondary;
   an input circuit connected between the input terminals and the primary for providing input current pulses to the primary;
   a controller for controlling pulse width of the input current pulses;
   an output circuit connected between the secondary and the output terminals for converting transformed pulses received from the secondary to the output power; and
   a current limiting circuit for causing the controller to control the pulse width of the input current pulses as a function of averaged current in the input circuit.

2. The power converter of claim 1 wherein the input circuit includes first and second switches connected to the primary and controlled by the controller to produce the input current pulses.

3. The power converter of claim 2 wherein the current limiting circuit comprises:
   first and second current sensing circuits for sensing input current pulses through the first and second switches;
   a filter for producing an averaged current signal based upon the input current pulses sensed;
   a limit circuit for producing a dynamic current limit signal as a function of the averaged current signal; and
   a comparator for providing a control signal to the controller as a function of a comparison of the current pulses sensed with the dynamic current limit signal.

4. A power converter comprising:
input terminals for receiving input power;
output terminals for supplying output power;
a transformer having a primary and a secondary;
an input circuit connected between the input terminals and the primary;
an output circuit connected between the secondary and the output terminals; and
a controller that limits current flow in the input circuit as a function of averaged current in the input circuit.

5. The power converter of claim 4 wherein the controller controls pulse width of current pulses in the input circuit based upon a dynamic current limit that is a function of the averaged current in the input circuit.

6. The power converter of claim 5 wherein the dynamic current limit has an initial maximum level and decreases over time as the averaged current increases.

7. The power converter of claim 4 and further comprising:
a current limiting circuit for providing a control signal to the controller based upon a comparison of current flow in the input circuit with a dynamic current limit based on the averaged current in the input circuit.

8. The power converter of claim 7 wherein the input circuit includes first and second switches connected to the primary and controlled by the controller to produce the input current pulses.

9. The power converter of claim 8 wherein the current limiting circuit comprises:
first and second sensing circuits for sensing input current pulses through the first and second switches;
a filter for producing an averaged current signal based upon the input current pulses sensed;
a limit circuit for producing a dynamic current limit signal as a function of the averaged current signal; and
a comparator for providing a control signal to the controller as a function of a comparison of the current pulses sensed with the dynamic current limit signal.

10. A power converter comprising:
input terminals for receiving input power;
output terminals for supplying output power;
a transformer having a primary and a secondary;
an input circuit connected between the input terminals and the primary for providing input current pulses to the primary;
an output circuit connected between the secondary and the output terminals for converting transformed pulses received from the secondary to the output power; and
means for limiting pulse width of the input current pulses based upon a dynamic current limit that varies over time as a function of averaged current in the input circuit.

11. The power converter of claim 10 wherein the input circuit includes first and second switches connected to the primary and controlled by the controller to produce the input current pulses.

12. The power converter of claim 2 wherein the means for limiting comprises:
first and second current sensing circuits for sensing input current pulses through the first and second switches;
a filter for producing an averaged current signal based upon the input current pulses sensed;
a limit circuit for producing a dynamic current limit signal as a function of the averaged current signal;
a comparator for providing a control signal to the controller as a function of a comparison of the current pulses sensed with the dynamic current limit signal; and
a controller for controlling pulse width of the current pulses within a range defined by the dynamic current limit signal.

* * * * *